Nov. 15, 1932.                H. T. DYER                  1,888,074
                            GAS CARBURETOR
                          Filed Dec. 6, 1927

INVENTOR.
HORACE TYLER DYER
BY Newell + Spencer
ATTORNEYS.

Patented Nov. 15, 1932

1,888,074

UNITED STATES PATENT OFFICE

HORACE TYLER DYER, OF GREENWICH, CONNECTICUT

GAS CARBURETOR

Application filed December 6, 1927. Serial No. 238,015.

This invention relates to the production of illuminating or combustible gas and particularly to the enriching of gas by addition of hydrocarbons and to carburetors for enriching gas by addition of hydrocarbons thereto.

Manufactured gas is frequently produced by alternately blasting a bed of incandescent coal or coke with air and steam whereby water gas is generated. When the bed of carbon is being blasted with air, the resulting gas consists largely of carbon monoxide which is burned in a gas carburetor to raise the carburetor to the proper temperature. In the second or water gas producing phase of the operation the bed of coal is blasted with steam and the water gas produced passed to the carburetor where oil is sprayed into the hot water gas. The high temperature of the carburetor decomposes the oil into hydrocarbon gases which are added to the gas leaving the carburetor, and give it the necessary illuminating qualities. Producer gas is similarly made using air or carbon dioxide instead of steam.

In the enriching or carburetion of the lean gas, as ordinarily carried out the combustible gas is passed into the carburetor so that a part of the oil is blown against the walls of the carburetor and decomposed, forming soot or tar, which interferes with the operation of the carburetor, results in a waste of the oil being introduced and requires frequent cleaning of the carburetor.

Furthermore, when the combustible gas is introduced at one side of the carburetor the carbureting oil is not uniformly mixed with the incoming gas so that it is necessary to employ an excess of the oil in order to be sure that the resulting gas will have the proper illuminating qualities throughout.

One of the objects of the invention is to eliminate waste of the carbureting oil and decrease the formation of soot and tar in the carburetor.

Another object of the present invention is to uniformly distribute the carbureting oil throughout the fuel gas with which it is mixed.

An important feature of the present invention, in the form illustrated, resides in certain constructions by means of which the combustible gas to be carbureted is introduced into the carburetor in such a manner as to prevent the carbureting oil from coming into contact with the heated walls of the carburetor and effect a proper mixing of the combustible gas and enriching products.

Other features of the invention reside in novel constructions and combinations more fully set forth hereafter. The invention will be clearly understood by reference to the accompanying drawing, which illustrates a preferred embodiment, and in which—

Figure 2 is a diagrammatic top plan view representation of an annular conduit through which the gas to be carbureted passes into the carburetor.

Figure 3 is a similar representation of a modification from the form of annular conduit shown in Figure 2; and Figure 4 is a representation similar to Figure 2 of a further modification from the form of annular conduit shown in Figure 2.

Figure 1:
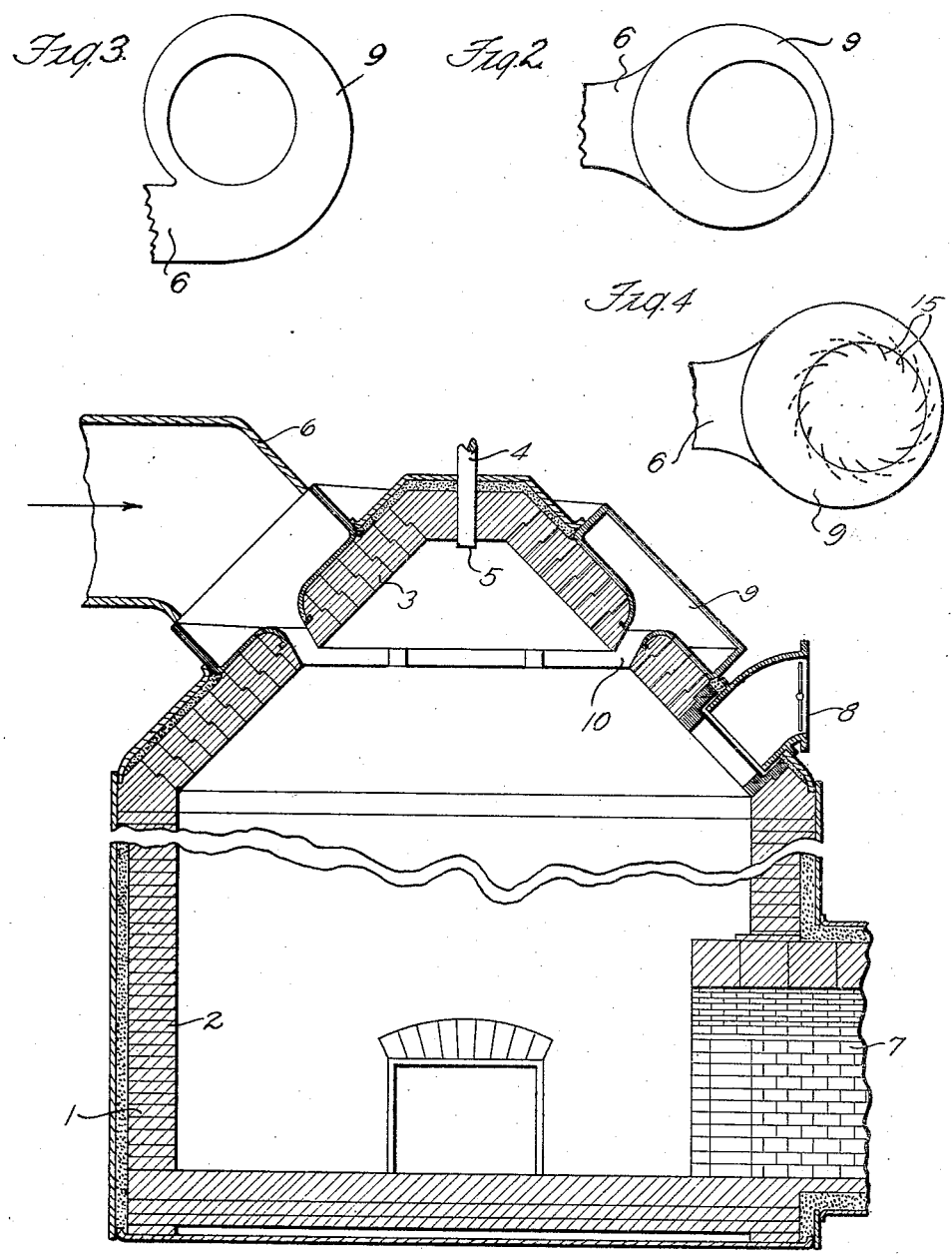
Figure 1 is a vertical sectional view of a gas carburetor embodying the invention.

In accordance with the present invention as illustrated in Figure 1, a carburetor of any suitable construction is provided having walls 1 composed of firebrick 2 or other refractory material and having an upper end 3 which may be cone-shaped and into which an oil pipe 4 passes having an outlet 5 including a suitable nozzle for introducing the carbureting oil into the incoming combustible gas in the form of a fine spray. The carburetor may contain checker work or firebrick if desired, but such checker work, etc., if used, must not be in the path of the spray, and sufficient unobstructed space must be provided to allow conversion of the sprayed liquid into gas, but not necessarily a fixed gas, before the checker work, etc., is encountered.

The combustible gas from the gas producer, water gas generator, or any other desired apparatus for manufacturing fuel gas (not shown), passes to the carburetor through an inlet pipe 6 to be mixed with the carbureting oil and the enriched gas passes out of the carburetor through the outlet 7. An air inlet 8 may be provided for introducing air to be mixed with the air blast gas containing carbon monoxide gas produced during the first phase of the gas-making operation to support combustion of this gas and raise the carburetor to the desired operating temperature.

In order that the combustible gas entering the carburetor during the second phase of the gas-making operation may be prevented from coming into contact with the walls of the carburetor and at the same time thoroughly and uniformly mixed with the illuminating hydrocarbons produced by the decomposition of the carbureting oil introduced through the inlet 5, the incoming combustible gas from the inlet pipe 6 is passed into an annular conduit 9 from which it passes through the downwardly-sloping passageway 10 into the carburetor in the form of a cone-shaped stream of gas directed toward the center of the carburetor and toward the incoming spray of carbureting oil.

By so directing the incoming combustible gas that the carbureting oil is swept toward the center of the carburetor and away from the incandescent or highly heated walls of the carburetor the formation of soot or tar in the chamber is materially lessened. At the same time a thorough intermingling of the combustible gas with the illuminating hydrocarbons is effected and the amount of oil which must be introduced to insure the proper illuminating qualities in the resulting gas is decreased.

This desirable result may be attained by various constructions.

As illustrated in Figures 1 and 2, the annular conduit 9 through which the incoming combustible gas is passed is located eccentric to the carburetor in order that the incoming gas may be forced into the carburetor equally from all sides by reason of the constantly decreasing volume of the annular conduit as the distance from the radially-extending inlet 6 is increased. This even distribution of the incoming gas may be effected in any suitable manner and as illustrated in Figure 3 the combustible gas may be introduced tangentially into the annular conduit 9 from the inlet pipe 6 and caused to enter the chamber at all sides of the carburetor as a result of the decreasing cross-section of the annular conduit at points farther from the inlet pipe 6.

As shown in Figure 4 the passageway 10 through which the combustible gas passes from the conduit 9 into the carburetor may be provided with deflecting members 15 for giving to the incoming combustible gas a swirling circular motion in the carburetor to increase the distance of travel of the spray carrying gases before contacting with the walls of the chamber. This circular motion should, of course, be such as to further assist in directing the oil spray away from the walls of the carburetor and in intimately mingling the combustible gas and carbureting oil and obviously should not be such as to exert a violent centrifugal action which would separate the oil from the gas, or drive the gas stream in which the oil is entrained against the walls of the chamber. Any such violent centrifugal action would, of course, defeat the very purpose of the swirling or circular motion.

The passageway 10 need not be in the form shown and may not direct the combustible gas into the carburetor in a cone-shaped stream, but the passageway may be divided into a plurality of ports spaced as desired. The design and construction of the annular conduit as well as the passageways 10 may take any suitable form but the incoming combustible gas should be supplied to the carburetor in such a manner as to cause the carbureting oil being sprayed into the carburetor to be swept away from the walls of the carburetor.

If several oil-spraying inlets are provided the shape and construction of the combustible gas distributing conduit and passageways may be considerably altered from that shown in the drawing in order to effect the proper distribution of the incoming gas with reference to each of a plurality of carbureting oil inlets.

It is to be understood that the invention is not limited to the particular construction shown but may take numerous other forms than that used by way of illustration without departing from the scope of the invention as defined by the claims.

In the accompanying claims I have used the word "stream" to include the flow of gas which is utilized for holding the spray of oil away from the walls of the carbureting chamber. I have used this word inclusively to cover a flow of gas from several jets or from a single continuous passage. The word "gas" I have used in the accompanying claims in its strict sense to include the gaseous phase whether condensable at ordinary temperatures or so-called "fixed" gases which remain in the gaseous phase even at relative-low temperatures. For the sake of brevity in the claims I have used the phrase "highly heated" to describe the range of temperatures sufficiently high to convert the greater part of the liquid hydrocarbons into gas.

What is claimed as new is:

1. A gas carburetor for introducing enriching hydrocarbons into combustible gas which comprises a chamber, a carbureting-oil inlet for spraying oil into said chamber, and one or more passageways through which combustible gas to be carbureted may be passed into said chamber at a plurality of points so positioned about said carbureting-oil inlet that the spray will be entrained by the gases flowing from said passageways and carried thereby toward the center of the chamber before contacting with any of the walls thereof.

2. A gas carburetor for introducing enriching hydrocarbons into combustible gas which comprises a chamber, a carbureting-oil inlet adapted for spraying oil into a central space of said chamber, a conduit surrounding said carbureting-oil inlet, and at least one passageway from the said conduit to said chamber through which combustible gas to be carbureted may be passed into the chamber from points surrounding the spray and in a direction so related to the spray of oil as to urge it away from the walls of the chamber.

3. A gas carburetor for introducing enriching hydrocarbons into combustible gas which comprises a chamber, a carbureting-oil inlet in said chamber, an annular conduit for distributing combustible gas to be carbureted about said chamber, said conduit becoming gradually smaller in cross-section from the inlet to said conduit to the diametrically opposite part of said conduit, and a passageway for introducing the combustible gas to be carbureted from said conduit into said carburetor at a plurality of points about said carbureting oil inlet, and spaced circumferentially on said conduit.

4. A gas carburetor for introducing enriching hydrocarbons into combustible gas which comprises a chamber, a conduit for distributing combustible gas to be carbureted about said chamber, a passageway for introducing the fuel gas to be carbureted into said carburetor at a plurality of points about said carbureting-oil inlet, means for giving the incoming combustible gas a rotary motion as it enters said carburetor from said conduit, means for introducing a spray of carbureting oil into said chamber substantially at the axis of rotation of the combustible gas.

5. A gas carburetor for introducing enriching hydrocarbons into combustible gas which comprises a carbureting chamber, a carbureting-oil inlet in the upper end of said chamber, a combustible gas inlet pipe for conducting combustible gas to be carbureted to said carbureting chamber, a distributing chamber connected with said combustible gas inlet pipe, and provided with passageways adapted to impart a cone shape to the stream of gas which enters the carbureting chamber around the carbureting oil inlet from said distributing chamber and to direct said stream away from the walls of said carbureting chamber.

6. The method of enriching combustible gas by the addition of heavy hydrocarbons which comprises establishing a blast of combustible gases at a temperature sufficient to convert said hydrocarbons into gas, maintaining around said blast of hot gases a relatively quiet body of gas, spraying the enriching hydrocarbon material centrally into said blast, entraining said spray in the gases of said blast, and passing said gases through an unobstructed space and away from the confining walls, until the enriching material is substantially entirely converted into gas.

7. The method of enriching combustible gases by the addition of heavy hydrocarbons which comprises establishing a blast of the gas at a temperature adapted to convert the enriching material into gas, spraying the enriching material into said blast of gas, entraining said spray into said blast and creating turbulence in the gases in which said spray is entrained, and preventing said entrained spray from contacting with walls or other solid obstructions until said spray is substantially entirely converted into gas.

8. The method of enriching combustible gases which comprises establishing a blast of the combustible gas at a temperature substantially above that at which the hydrocarbon oil used for enriching is converted into gas, entraining the hydrocarbon oil in said blast, and maintaining the gases of said blast so long as they contain liquid hydrocarbons away from surfaces heated to temperatures which would cause decomposition of the liquid hydrocarbons.

9. The method as defined in claim 8, in which the blast of gas is established in a larger body of gas contained within a chamber the walls of which radiate heat into said gas.

10. The method of enriching combustible gases by addition of a hydrocarbon oil which comprises maintaining the combustible gas at temperatures sufficient to convert the oil into gas, heating a chamber having a substantially unobstructed vaporizing space, directing the hot gas into said chamber in a stream different parts of which converge toward a point below the points at which the stream enters the chamber, and spraying the hydrocarbon oil into the vaporizing space between converging portions of the stream.

11. The method of enriching combustible gases by addition of a hydrocarbon oil which comprises heating to a temperature adapted to convert enriching oils into gas, a vaporizing chamber having a substantially unobstructed vaporizing space, spraying the enriching oil into said vaporizing space, and establishing substantially on all sides of said spray a stream of gas which is adapted to hold said spray away from the heated walls of said chamber until the oil is substantially all converted into gas, said gas being at a temperature adapted to convert substantially all of said oil into gas.

12. The process as defined in claim 11 in which the stream of gas is given a rotary motion within said chamber insufficient to drive the stream against the chamber walls and the spray of oil is directed into said chamber near the axis of rotation of said stream.

Signed at New York, N. Y., this 5th day of December, 1927.

HORACE TYLER DYER.